May 13, 1952 — A. I. ZUMWALT — 2,596,322
MAGNETIC CARRIAGE
Filed Sept. 29, 1949 — 3 Sheets-Sheet 1

Arlie I. Zumwalt
INVENTOR.

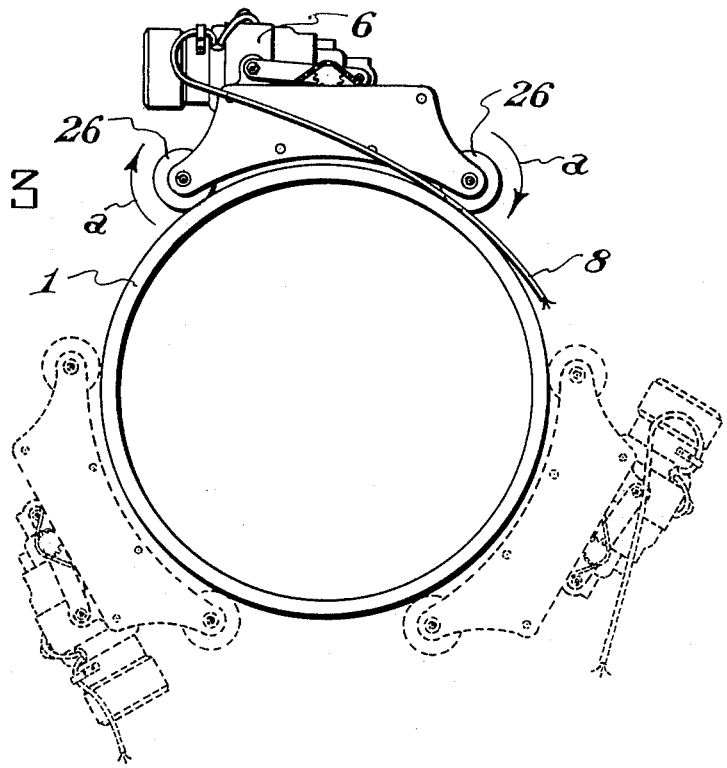
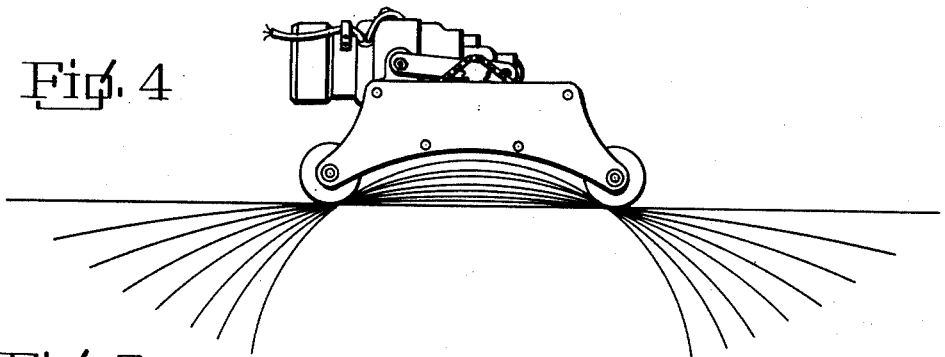
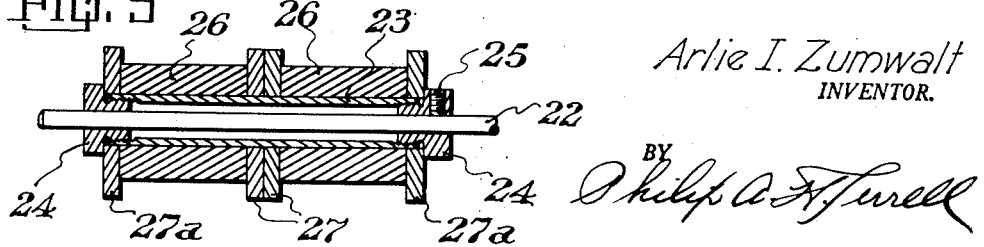

May 13, 1952  A. I. ZUMWALT  2,596,322
MAGNETIC CARRIAGE
Filed Sept. 29, 1949  3 Sheets-Sheet 3
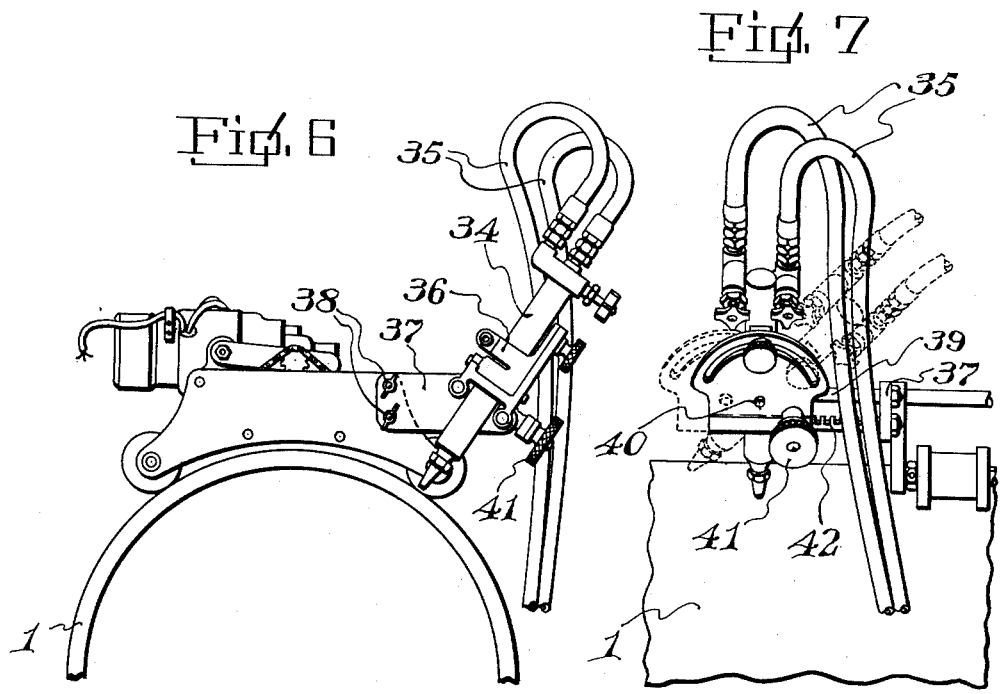
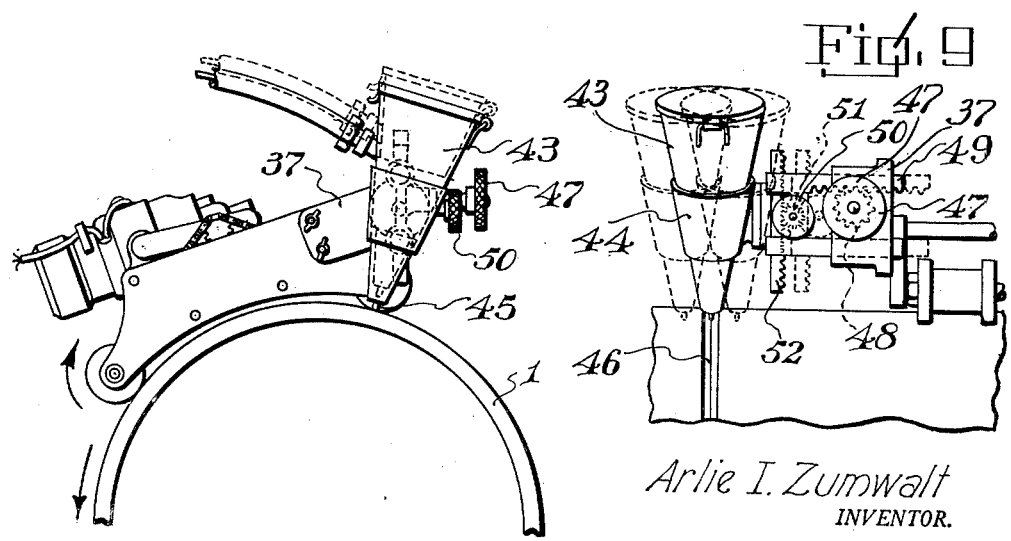
Arlie I. Zumwalt
INVENTOR.
BY
Philip A. H. Purell Patented May 13, 1952

2,596,322

UNITED STATES PATENT OFFICE 2,596,322

MAGNETIC CARRIAGE

Arlie I. Zumwalt, Tulsa, Okla., assignor, by direct and mesne assignments, to ZeGCo Products Incorporated, Tulsa, Okla., a corporation of Oklahoma Application September 29, 1949, Serial No. 118,671

3 Claims. (Cl. 33—21)

1

The invention relates to a tool carrying carriage, self propelled and magnetically supported on a curved or flat surface, and adapted to accurately guide a tool of the acetylene cutting type, or of the welding type, and magnetically held to the work as it moves over the curved or flat surface, thereby obviating the use of mechanical members involving gear rings now used for a traversing carriage around large pipes and the like.

A further object is to provide the carriage with means whereby various metal working tools can be attached to the carriage and adjusted for the line of work.

A further object is to arcuately shape the under side of the carriage so the magnetic wheels can engage the curved surface, at spaced points, without engagement with the carriage, and the device may be supported and utilized in working on curved surfaces of different diameters.

A further object is to mount a propelling motor on the carriage, and to provide a positive driving connection between the motor and the wheels so there will be a positive advancement of the carriage around the work with the wheels rotating at the same speed, thereby insuring a straight line cutting operation when the pipe is cut, welded or bevelled.

A further object is to mount the wheels between magnets, which magnets and wheels are insulated from the frame of the carriage, said wheels and magnets being carried by a rotatable shaft driven from the motor.

A further object is to pivotally mount the motor in the carriage frame, and to provide a driving connection from the motor to the magnet carrying shaft at the forward and rear ends of the carriage. Also to provide means whereby the motor may be pivotally adjusted and locked in adjusted position.

A further object is to provide a welding or pipe cutting machine, wheel supported. on a convex or concave surface, said machine being self-propelled over the surface and held to the work during its movement solely by magnetic attracting, thereby obviating special rigs at present used in traversing cutting machines.

With the above and other objects in view the invention resides in the combination and arrangement of parts as hereinafter set forth, shown in the drawings, described and claimed. it being understood that changes in the precise embodiment of the invention may be made without departing from the spirit of the invention.

In the drawings:

2

Figure 3 is an end view of a pipe, showing the machine in side elevation in full lines, and in dotted lines, its position as it encircles the pipe.

Figure 4 is a side elevation of the machine, but showing the various arcs it will accommodate, whether convex or concave.

Figure 5 is a vertical longitudinal sectional view through one of the magnet carrying units, and the wheels in connection therewith.

Figure 6 is a view similar to Figure 1, but showing a cutting torch carried by the side of the carriage.

Figure 7 is a front elevation of Figure 6.

Figure 8 is a view similar to Figure 6, but showing a shielded arc head supported on the carriage for a welding operation.

Figure 9 is a front elevation of the device, as shown in Figure 8.

Figures 1, 2:
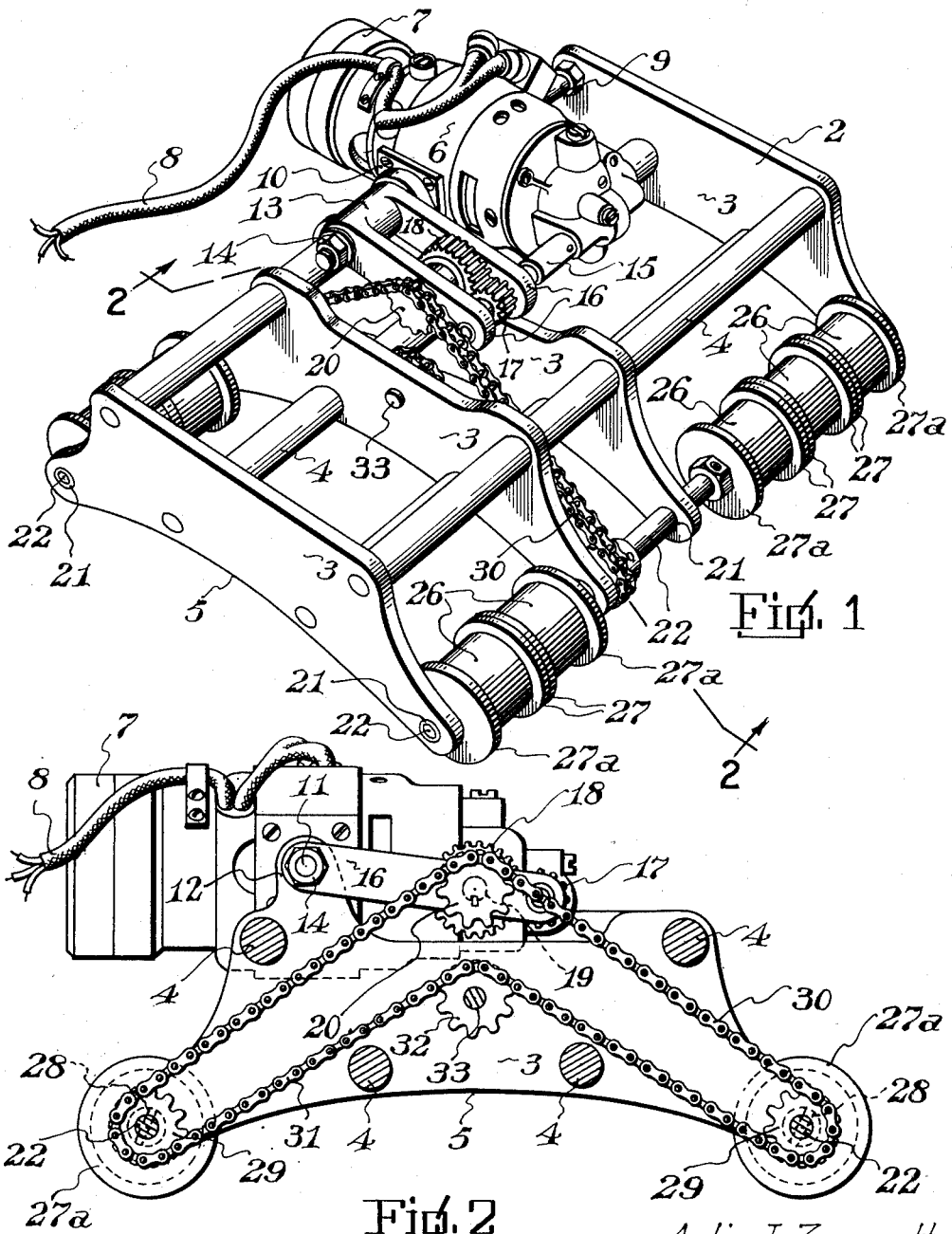
Figure 1 is a perspective view of the machine.
Figure 2 is a vertical longitudinal sectional view through the machine, taken on line 2—2 of Figure 1.

The device is particularly adapted for cutting large pipes or other cylindrical articles, from the inside or outside. For purposes of illustration, the device is described and shown on a pipe 1, which is to be cut, bevelled or welded.

The machine comprises a carriage 2 formed from spaced plates 3 rigidly connected together by transverse rods 4. The under edges of the plates 3 are arcuately shaped as at 5 so the device can move over cylindrical objects of various diameters. Disposed between adjacent plates 3 at one side of the carriage, and pivotally movable in a vertical longitudinal plane, is a motor 6, which motor may be of any type, however it is preferably of the reversible type so the machine may be propelled forwardly or rearwardly as desired. It may also have a conventional rheostat 7 for regulating the speed of operation of the machine. Power may be supplied in any suitable manner, for instance through the lead line 8. The motor 6 is provided a pintle 9, supported by the end plate 3, and also secured to the opposite side of the motor is plate 10 having a pintle 11, which pintle extends through an ear 12 at the rear end of the adjacent plate 3. Pintle 11 is relatively long and has rockably mounted thereon, for adjustment, a fork 13, which fork can be locked against movement in a vertical longitudinal plane after an adjustment by a nut 14. The inner end of the motor 6 is provided with a transverse drive shaft 15 having bearings in the end of the arms 16 of the fork 14, and keyed on said shaft, between the arms 16, is a drive pinion 17 which meshes with a larger driven pinion 18 carried by a shaft 19, which shaft 19 extends through the arms 16. A sprocket 20 is carried by one end of the shaft 19 and located adjacent the vertical longitudinal center of the machine.

Rotatably mounted in bearings 21 of the forward and rear ends of the spaced plates 3 are rotatable shafts 22. Shafts 22 are formed from non-magnetic material, for instance brass, and surrounded in spaced relation thereto by non-magnetic sleeves 23, into the ends of which sleeves are threaded nuts 24, which nuts are also formed from non-magnetic material, and one of the nuts is locked to the shafts 22 by a set screw 25. Disposed on the sleeves 23 are magnets 26, which magnets may be of the permanent type or electric magnets as desired. Interposed between adjacent magnets 26 are normalized steel discs or wheels 27, and also at the ends of the magnets are similar discs 27a. Wheels or discs 27 and 27a engage the periphery of the pipe, inside or outside, and the magnets hold the carriage to the work as it is propelled around the pipe or over the work by the motor. It will be noted that magnets and wheels are in pairs, and the magnets are relatively strong in relation to the total weight of the machine. In the present machine the magnetic attraction is two hundred pounds, and the weight of the machine is thirty five pounds, hence it will be seen that with this magnetic attraction the wheels will not slip, as the machine traverses a surface. The pipes 1, on which the machine is usually used, are from sixteen inch diameter upwardly, however applicant does not limit himself in this respect.

Shafts 22 have secured thereto, by means of pins 28, driven sprockets 29, and these sprockets are driven by an endless sprocket chain 30, which chain extends over the sprockets 29 and over the sprocket 20 driven by the motor. The lower flight 31 of the sprocket chain extends over an idle sprocket 32 carried by a stud 33 secured to one of the plates 3. By adjusting the nut 14, and the fork 13, all slack can be taken up from the sprocket chain, and the idle sprocket 32 will raise the lower flight of the chain above the lower edges of the plates 3 where the chain will not engage the periphery of the work.

Referring to Figures 6 and 7 wherein a conventional form of cutting torch 34 is shown, this torch is of the usual acetylene and oxygen type, supplied by the usual hose 35. The torch is clamped in a tool holder 36 carried by a plate 37 secured to the side plate 3 by a thumb nut bolt 38. The holder 36 is pivotally connected and supported for universal adjustment on a supporting shaft 39 and a pivotal point 40 so the torch can be adjusted for a bevelling operation, as shown in dotted lines in Figure 7, or for a cutting operation, shown in full lines in Figure 7. Also adjusted inwardly and outwardly by an adjusting nut 41, which nut has a gear meshing with a rack 42 carried by the plate 37.

Referring to Figures 8 and 9, the carriage structure is the same, however the plate 37 supports a shielded arc head of conventional form for a welding operation after edges have been bevelled, as shown in Figure 9. The arc head 43 is supported in a conical sleeve 44, and this sleeve is adjustable inwardly and outwardly, or upwardly, for adjusting the welding point 45 in relation to the line of weld 46. This adjustment is accomplished in its inward and outward movement by an adjusting finger engaging member 47, which finger engaging member rotates a gear 48 meshing with a rack bar 49 slidably mounted in the plate 37. The upward and downward adjustment is accomplished by the rotation of the finger engaging member 50, which member 50 rotates a gear 51 meshing with a vertical rack bar 52. It will be seen that the shielded arc head can be accurately adjusted to a radial position bisecting the axis of the pipe 1. It will also be noted, by placing the torch, as well as the welding point 45 across the axis of the pipe engaging wheels and bisecting the axis of the pipe, the point of work will follow any unevenness in the pipe, for instance, raised places or flat surfaces, hence there will be a positive positioning of the work points, constantly maintained as the machine encircles the work, and the maximum efficiency will be maintained at all times.

In operation, the machine is placed on the pipe or other work in the position shown in Figure 3, the motor is started, after a previous proper adjustment of the cutting or welding tool carried by the carriage. The power supply cord 8 is placed over the right side of the pipe, and as the motor operates the wheels 26 are rotated in the direction of the arrows a in Figure 3. The work continues from its starting point, around the pipe, to its starting point again, hence the pipe will be severed, bevelled or welded. During this encircling the carriage is accurately guided and held to the periphery of the pipe by the magnetic attraction of the magnets to the pipe.

In some cases it is desired to cut a cylinder which is being rotated, therefore it will be seen that the speed of the motor may be regulated through the medium of the rheostat to correspond to the speed of rotation, and when so used, the machine maintains its position on the upper side of the rotated work. Otherwise the operation is the same as previously described.

From the above it will be seen that a traversing torch or welding tool carrying device is provided which is held to the work by magnetic attraction as it traverses rearwardly or forwardly; the rearward movement being desirable at times for a short distance, hence a reversible motor is desirable.

The invention having been set forth what is claimed as new and useful is:

1. A self propelled tool carrying machine adapted to move around a pipe while the tool carried thereby performs work on the pipe, said machine comprising a carriage; said carriage comprising spaced side plates, said spaced side plates being connected together by transverse rods, forward and rear driven shafts carried by the forward and rear ends of the side plates, magnetic rollers carried by said shafts at their ends, sprockets carried by said shafts intermediate their ends, a motor pivotally mounted on said carriage on one side thereof, a drive pinion carried by the motor, a driven sprocket driven by the drive pinion, an endless sprocket chain extending over the driven sprocket and over the sprockets carried by the shafts and forming means whereby the shafts are rotated and the magnetic wheels rotated therewith for causing the machine as a whole to move around the pipe.

2. A device as set forth in claim 1 including a fork pivotally mounted to one side of the motor, the motor drive pinion being disposed between the arms of the fork, said drive pinion being carried by a shaft driven by the motor, an intermediate gear meshing with the drive pinion and disposed between the arms of the fork, said drive sprocket being driven by the intermediate drive pinion.

3. A device as set forth in claim 1 including a tool holder to one side of one of the side plates and carried by said side plate, said tool holder comprising a supporting bracket, a rack bar carried by said bracket, a tool carrying pivoted member movable inwardly and outwardly on said rack bar, said pivotally mounted member being pivotally movable on its pivotal point towards and away from the side of the carriage.

ARLIE I. ZUMWALT.

REFERENCES CITED

The following references are of record in the file of this patent:

UNITED STATES PATENTS

| Number | Name | Date |
|---|---|---|
| 1,879,346 | Lawrence | Sept. 27, 1932 |
| 1,879,444 | Ost et al. | Sept. 27, 1932 |
| 1,981,340 | Anderson | Nov. 20, 1934 |
| 1,998,729 | Mathey et al. | Apr. 23, 1935 |
| 2,030,840 | Allen | Feb. 18, 1936 |
| 2,098,262 | Temple | Nov. 9, 1937 |

FOREIGN PATENTS

| Number | Country | Date |
|---|---|---|
| 523,573 | Great Britain | July 17, 1940 |